(12) United States Patent  
Townsend

(10) Patent No.: US 8,060,666 B2
(45) Date of Patent: *Nov. 15, 2011

(54) SYSTEM AND METHOD FOR PROVIDING SERIAL BUS CONNECTIVITY

(75) Inventor: Karl Townsend, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/772,878

(22) Filed: May 3, 2010

(65) Prior Publication Data

US 2010/0211701 A1  Aug. 19, 2010

Related U.S. Application Data

(63) Continuation of application No. 11/428,294, filed on Jun. 30, 2006, now Pat. No. 7,734,841.

(51) Int. Cl.
G06F 3/00 (2006.01)
(52) U.S. Cl. ........................................................ 710/16
(58) Field of Classification Search ...................... 710/16
See application file for complete search history.

(56) References Cited

U.S. PATENT DOCUMENTS

| | | |
|---|---|---|
| 3,744,034 A | 7/1973 | Paul |
| 4,233,553 A | 11/1980 | Prince et al. |
| 4,860,372 A | 8/1989 | Kuzunuki et al. |
| 4,972,496 A | 11/1990 | Sklarew |
| 5,231,381 A | 7/1993 | Duwaer |
| 5,305,394 A | 4/1994 | Tanaka |
| 5,332,993 A | 7/1994 | Ninomiya |
| 5,349,668 A | 9/1994 | Gladstein et al. |
| 5,386,567 A | 1/1995 | Lien et al. |
| 5,389,745 A | 2/1995 | Sakamoto |
| 5,434,929 A | 7/1995 | Beernink et al. |
| 5,442,794 A | 8/1995 | Wisor et al. |
| 5,444,192 A | 8/1995 | Shetye et al. |
| 5,452,371 A | 9/1995 | Bozinovic et al. |
| 5,463,261 A | 10/1995 | Skarda et al. |
| 5,463,742 A | 10/1995 | Kobayashi |
| 5,504,908 A | 4/1996 | Ikeda |
| 5,528,743 A | 6/1996 | Tou et al. |
| 5,534,892 A | 7/1996 | Tagawa |
| 5,557,738 A | 9/1996 | Townsley et al. |
| 5,581,772 A | 12/1996 | Nanno et al. |
| 5,613,135 A | 3/1997 | Sakai et al. |
| 5,615,284 A | 3/1997 | Rhyne et al. |
| 5,621,817 A | 4/1997 | Bozinovic et al. |

(Continued)

FOREIGN PATENT DOCUMENTS

EP 0560510 A1 9/1993

(Continued)

OTHER PUBLICATIONS

Ed Nisley, "Two-Way Power Line Communication", Mar. 1992, The Computer Applications Journal, pp. 74-76,78-81.

(Continued)

Primary Examiner — Alford Kindred
Assistant Examiner — Farley Abad

(57) ABSTRACT

Versatile serial bus connectivity is provided for enabling detection and use of passive media output devices that connect to a host device through a serial bus connector. In addition, serial bus connectivity is extended to video output devices that can use analog video data.

19 Claims, 4 Drawing Sheets

U.S. PATENT DOCUMENTS

| | | | |
|---|---|---|---|
| 5,630,148 A | 5/1997 | Norris | |
| 5,648,762 A | 7/1997 | Ichimura et al. | |
| 5,652,891 A | 7/1997 | Kitamura et al. | |
| 5,666,256 A | 9/1997 | Zavis et al. | |
| 5,673,357 A | 9/1997 | Shima | |
| 5,698,822 A | 12/1997 | Haneda et al. | |
| 5,710,931 A | 1/1998 | Nakamura et al. | |
| 5,717,936 A | 2/1998 | Uskali | |
| 5,754,436 A | 5/1998 | Walsh et al. | |
| 5,758,099 A | 5/1998 | Grieco et al. | |
| 5,781,744 A | 7/1998 | Johnson et al. | |
| 5,783,926 A | 7/1998 | Moon et al. | |
| 5,784,295 A | 7/1998 | Hinohara | |
| 5,832,286 A | 11/1998 | Yoshida | |
| 5,841,901 A | 11/1998 | Arai et al. | |
| 5,859,522 A | 1/1999 | Theobald | |
| 5,859,970 A | 1/1999 | Pleso | |
| 5,946,392 A | 8/1999 | Tague | |
| 5,948,077 A | 9/1999 | Choi et al. | |
| 6,038,457 A | 3/2000 | Barkat | |
| 6,069,960 A | 5/2000 | Mizukami et al. | |
| 6,073,201 A | 6/2000 | Jolley et al. | |
| 6,334,160 B1 | 12/2001 | Emmert et al. | |
| 6,359,987 B1 | 3/2002 | Tran et al. | |
| 6,452,402 B1 * | 9/2002 | Kerai | 324/538 |
| 6,457,134 B1 | 9/2002 | Lemke et al. | |
| 6,523,124 B1 | 2/2003 | Lunsford et al. | |
| 6,594,366 B1 | 7/2003 | Adams | |
| 6,665,803 B2 | 12/2003 | Lunsford et al. | |
| 6,988,905 B2 | 1/2006 | Corey et al. | |
| 7,103,381 B1 | 9/2006 | Wright et al. | |
| 7,152,190 B2 | 12/2006 | Overtoom | |
| 7,296,098 B2 | 11/2007 | Shih | |
| 7,329,136 B2 | 2/2008 | Su et al. | |
| 7,330,215 B2 | 2/2008 | Ito | |
| 7,340,284 B2 | 3/2008 | Chung | |
| 2002/0091953 A1 | 7/2002 | Min | |
| 2003/0232648 A1 | 12/2003 | Prindle | |
| 2004/0019732 A1 | 1/2004 | Overtoom et al. | |
| 2004/0032394 A1 | 2/2004 | Ayatsuka et al. | |
| 2004/0233181 A1 | 11/2004 | Kobayashi | |
| 2005/0060490 A1 | 3/2005 | Lu | |
| 2005/0064905 A1 | 3/2005 | Pinder | |
| 2005/0078935 A1 | 4/2005 | Sun | |
| 2006/0033809 A1 | 2/2006 | Farley | |
| 2006/0047982 A1 | 3/2006 | Lo et al. | |
| 2006/0052072 A1 | 3/2006 | Hess et al. | |
| 2006/0068910 A1 | 3/2006 | Schmidt et al. | |
| 2006/0104453 A1 | 5/2006 | Lee et al. | |
| 2008/0071963 A1 | 3/2008 | Chow et al. | |

FOREIGN PATENT DOCUMENTS

| | | |
|---|---|---|
| EP | 0861008 A1 | 8/1998 |
| WO | WO2007/135522 A2 | 11/2007 |

OTHER PUBLICATIONS

Non-Final Office Action mailed Mar. 9, 2010 for U.S. Appl. No. 11/210,328; 31 Pages.

On-The-Go Supplemental to the USB 2.0 Specification, USB Implementers Forum, Inc. (USB-IF), 81 pages, dated Apr. 4, 2006.

USB 2.0 Specification, 650 pages, dated Apr. 27, 2000.

USB 2.0 Specification Engineering Change Notice (ECN) #1: Mini-B connector, 45 pages, dated Oct. 20, 2000.

* cited by examiner

Fig. 5A
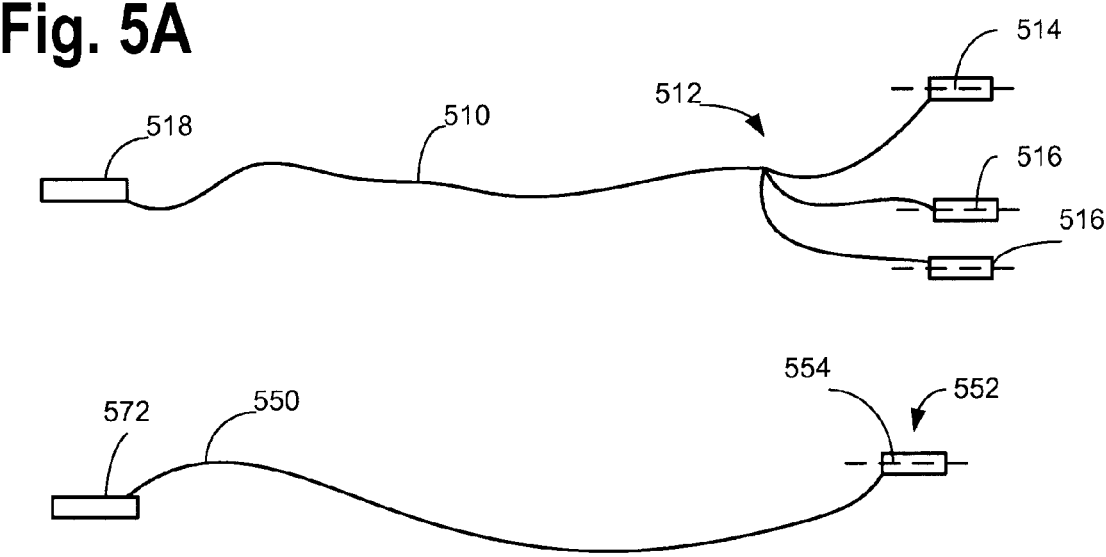
Fig. 5B
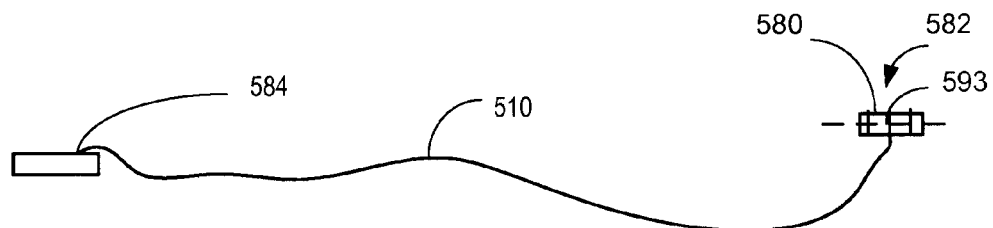
Fig. 5C

SYSTEM AND METHOD FOR PROVIDING SERIAL BUS CONNECTIVITY

RELATED APPLICATIONS

This application is a continuation of U.S. patent application Ser. No. 11/428,294, filed Jun. 30, 2006, now U.S. Pat. No. 7,734,841 entitled SYSTEM AND METHOD FOR PROVIDING SERIAL BUS CONNECTIVITY; the aforementioned priority application being hereby incorporated by reference in its respective entirety.

TECHNICAL FIELD

The disclosed embodiments relate generally to the field of connectivity. In particular, the disclosed embodiments relate to a system and method for providing serial bus connectivity.

BACKGROUND

The Universal Serial Bus (USB) is a connector standard that is in wide use. Currently, numerous standard bodies exist (USB 2.0) for enumerating requirements for implementation with USB connectors, including requirements for performance, hardware, form factor and various data transfer and connectivity protocols. As the USB connector becomes more popular and widespread, more applications and standards are adopted for the USB. In particular, there has been an effort to adopt standards by which the form factor of the USB becomes smaller, and has use in a variety of applications and environments in order to accommodate increasingly mobile and new computing devices.

As the name indicates, the USB connector acts as a data bus. In a standard mode of operation, the user is able to connect numerous devices to a single port using hubs. When devices are connected to a host, the host acts as a controller for all USB communications that enter through a particular port.

In general, the USB connector has a physical layer that includes hardware for implementing the data transfer protocol by which data is passed through the USB connector. The physical layer performs several functions, including serialization and de-serialization of transmissions, encoding and decoding of the signals. Across the USB connector, the protocol implemented provides for data packets that include token, data, and handshake packets.

Numerous standards have been and are currently being developed for the USB. These standards accommodate new smaller form factors, such as Mini-USB, as well as new data transfer protocols (e.g. USB 2.0). There is also a new standard for wireless USB ports. In addition, new standards accommodate use of USB connectors in various environments and applications. One standard is provided with "On-the-Go" which enables two devices connected through a USB port to negotiate for the role of the host. In particular, the On-The-Go Standard has introduced a Host Negotiation Protocol for enabling one device to act as host and controller in a one-to-one pairing.

Another more specific standard is the CEA-936A standard, which provides for use of USB connectors (Mini) in the context of "car kits". In this context, a mobile computing device, or even a vehicle component, can utilize accessory devices such as stereo headsets and car chargers. The CEA-936A is an offshoot of the On-The-Go standard. Among other functionality, the CEA-936A standard provides for the host to have the ability to detect the particular type or kind of device connected to it, using signal line characteristics that are caused by the coupling of the particular device.

BRIEF DESCRIPTION OF FIGURES

FIG. 5A illustrates a connector cable that connects a standard, video/audio port of a video output device to a small form factor-USB port, under an embodiment of the invention.

FIG. 5B illustrates an alternative connector cable that connects a video port of a video output device to a small form factor-USB port, under an embodiment of the invention.

FIG. 5C illustrates a multi-pin plug that connects a plug port of a device (video or otherwise) to a small form factor-USB port, under an embodiment of the invention.

DETAILED DESCRIPTION

Figures 1, 2:
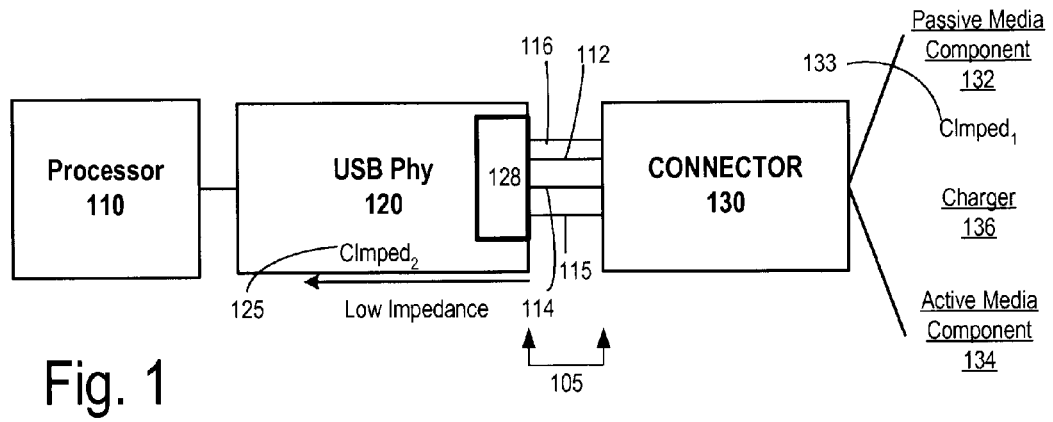
FIG. 1 is a block diagram of a system for providing serial bus connectivity to low-impedance devices, under an embodiment of the invention.
FIG. 2 illustrates a table 200 for identifying a type of device coupled to a connector system of a host such as described with FIG. 1, under an embodiment of the invention.

Embodiments described herein include a system and method for providing serial bus connectivity. When implemented on a host device, the serial bus connectivity provided by one or more embodiments described herein is versatile, in that the host device is capable of detecting a wide range of devices that can be connected through a serial bus connection. In particular, embodiments described herein provide for a system that can use a serial bus connection to detect both active and passive accessory devices, as well as chargers and other types of devices. The passive accessory devices include, for example, non-amplified audio devices, such as ear buds or stereo headphones. The versatility of the serial bus connection may be achieved while maintaining many of the requirements of an industry standard.

In addition, one or more embodiments also provide for a serial bus connection that can be operated in a mode where video analog data can be outputted through an alternative signal line of the serial bus connection. Many serial bus connections designate a pair of twisted data lines as the primary medium by which data is to be transferred. In this context, the alternative signal line used by one or more embodiments would include a signal line other than the twisted pair of data lines. In one implementation, for example, both video and stereo audio are output through a serial bus connection that is compliant with one or more USB type standards.

According to embodiments described herein, the serial bus connection is a USB type connection. As a USB connection, one or more embodiments assume a serial line and component configuration similar to an embodiment described with FIG. 1. Furthermore, one or more embodiments provide that the USB connection satisfies many of the requirements for use as small form-factor connectors (e.g. Mini USB), or with mobile and/or mobile environments (e.g. On-The-Go, CEA-936A). Other embodiments may apply to other forms of serial bus connections, such as, for example, serial bus connections that are compliant with the IEEE 1394 (so called "Firewire") standards.

Numerous types of computing devices may be used with embodiments described herein. One type of computing device that may be employed with one or more embodiments include mobile or portable computing devices, including wireless devices for use in messaging and telephony applications using cellular networks. Such devices are sometimes called "smart phones", "hybrid devices" or "multi-function devices". Mobile computing devices are generally small enough to fit in one hand, but provide cellular telephony features in combination with other applications. Examples of such other applications include contact applications for managing contact records, calendar applications for managing and scheduling events, task applications for keeping lists, and camera applications for capturing images. Additionally, many types of messaging transports may be provided on such mobile computing devices, including SMS, MMS, email and instant messaging.

Other examples of mobile computing devices contemplated for use with one or more embodiments described herein include portable media players, global positioning system devices, personal digital assistants, portable gaming machines, and/or devices that combine functionality of such devices. In addition, at least some embodiments described herein are applicable to desktop computers, laptops, and computer appliances (e.g. set-top boxes). A typical environment on which one or more embodiments may be implemented include a wireless telephony device that can be placed in an automobile or other mobile environment, and communicate with any one of a plurality of devices that include chargers, and both active and passive media headsets. Another environment on which one or more embodiments may be implemented includes a small form factor portable device (e.g. digital camera) that can be used to connect with a video output device.

In one embodiment, a system for providing serial bus connectivity includes a connector component that provides a plurality of signal lines. The connector component is configured to mate with a connector component of another device, so as to extend communications with the other device using the plurality of signal lines. The system also includes a physical layer coupled to the connector component to (i) receive input signals from the plurality of signal lines, and to (ii) send output signals over the plurality of signal lines. The system further comprises a processing resource. When the connector component is mated with the connector component of the other device, at least one of the processing resource and the physical layer is configured to identify the other device as being any device selected from a group consisting of: (i) a passive media device, (ii) an active media device, (iii) an adapter having a first current output for enabling recharge, and (iv) an adapter having a second current output for enabling recharge, wherein the second current output is greater than the first current output.

As used, the term "passive" in the context of an electrical device means a device that has no resource for increasing (at least measurably) the power or amplitude of an incoming signal.

Furthermore, the term "about" is intended to mean approximate, and when used in the context of a numerical value (e.g. "about equal to"), it is intended to mean a correspondence of at least 75% of the stated value.

In another embodiment, serial bus connectivity may provide connectivity to a video output device. In one embodiment, a video output device is detected as being connected to a serial bus connector. The serial bus connector includes a plurality of signal lines, where the signal lines include a pair of data lines that are capable of carrying data in bulk. A first signal line may be assigned transfer an analog video data to the video output device, where the first signal line is not one of the pair of signal lines. The pair of data lines may be used to transfer audio data to the video output device concurrently with the first signal line transferring the analog video data.

As used herein, the term "video output device" means a device that is capable of rendering or otherwise displaying video for a user.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Additionally, or more embodiments described herein may be implemented using modules. A module may include a program, a subroutine, a portion of a program, or a software component or a hardware component capable of performing one or more stated tasks or functions, or alternatively, a hardware component configured through software or other programmatic elements. As used herein, a module can exist on a hardware component independently of other modules, or a module can be a shared element or process of other modules, programs or machines.

The use of terms such as "component" or "element", when presented in the context of software or programming, may refer to code that can be executed to perform a stated function or task. Such code may execute or be shared with other components or elements, even when a component or element is described or shown to be disparate from other components.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), Secure Digital (SD) memory cards, and magnetic memory. Computers, terminals, network enabled devices (e.g. mobile devices such as cell phones) are all examples of machines and devices that utilize processors, memory, and instructions stored on computer-readable mediums.

Overview

FIG. 1 is a block diagram of a system for providing serial bus connectivity to paired devices that include low-impedance devices, under an embodiment of the invention. In FIG. 1, the serial bus connectivity is assumed to be provided in the form of a USB port, such as provided for Mini-USB under the CEA-936A standard. Other similar or smaller form-factor USB connectors (as compared to the Mini-USB connector) are also contemplated with embodiments described herein. The components of a system such as shown may be provided on one or more chips, internal to a computing device. For example, the processing resource 110 and the physical layer 120 may be provided on the same chip, or on different chips.

The connector system includes a processing resource 110, a physical layer 120, and a connector component 130. In one implementation, a connector system such as shown in FIG. 1 is provided under a design that corresponds to or is similar to a USB design (as promulgated by, for example, by the USB 2.0 standard). Accordingly, the physical layer 120 and the connector component 130 combine to form a USB connector port 105. The processing resource 110 may correspond to a processor of a host device. The host device may correspond to, for example, a mobile computing device, such as a smartphone, cellular device, multi-function portable device, or other wireless or cellular device. Alternatively, the mobile computing device may correspond to a portable media player.

The USB port 105 may be designed in accordance with, for example, any one of the standards in use today, including with USB On-The-Go and/or CEA-936A. Accordingly, as a USB connector port 105, the physical layer 120 and the connector component 130 may include the following signal lines (collectively the signal lines 108): voltage supply line 112, data pair lines 114 (Dplus and DMin), identity line 115 and ground 116. A system such as shown with FIG. 1 may be implemented to provide multiple modes of operation. For example, as a USB port 105, the modes of operation that can be handled under the CEA-936A standard include a data transfer mode (e.g. bulk data transfer) and an audio mode. The physical layer 120 and/or processing resource 110 may enable the USB port 105 as a whole to perform a mode switch. In the data transfer mode, the pair of data lines 114 handle the data transfer. But in audio mode, one implementation provides that the pair of data lines 114 carry audio data (for stereo output), while the identity signal line 115 is switched to carry, for example, an analog video data signal as described with an embodiment of FIG. 4. Such a mode switch is implemented by, for example, the CEA-936A standard for purpose of enabling the user to attach a stereo headset for use with a cellular device ("hands-free" cellular device use).

Under current use and standard implementations, the physical layer 120 includes signal characteristic detection functionality ("detector 128"). The detector 128 is capable of detecting different signal characteristics from the signal lines 108. A more detailed description of the various signal characteristics and the devices that can be detected from such generated signal characteristics (particularly from a standard similar to the CEA-936A) is described with FIG. 2. Under many such implementations and standards, the physical layer 120 has a characteristic line impedance 125 that requires the use of active components or chargers. For example, under the current CEA-936A standard, the characteristic line impedance 125 of the physical layer 120 is about 200K Ohms. At this value, the characteristic line impedance 125 is "line level" and adequate when a connected device is a device that amplifies the output (e.g. active media component 134) provided through the connector component 130. With line level output, the physical layer 120 does not provide adequate drive for passive devices that have media output ("passive media device 132"). For example, the line level output is not enough to drive an ear bud or other kind of non-amplified headset.

Under one embodiment, the physical layer 120 is formed to have the characteristic line impedance 125 that enables drive level output, at least for passive media devices 132. At drive level, the characteristic line impedance 125 is less than the characteristic impedance 133 of the passive media device 132. In one embodiment, the characteristic line impedance 125 less than the characteristic impedance of the lowest accommodated device (assumed to be a type of passive media device 132) by a ratio that can range between 1:2 to 1:20. In one implementation, the ratio of the characteristic impedance 133 of the passive media device 132 to the characteristic line impedance 125 of the physical component is about 3-4:1. For example, in the case where the characteristic impedance 133 of the passive media device is about 32K Ohms, the physical layer 120 may be designed to have the characteristic line impedance 125 have a value of about 10K Ohms.

With the characteristic line impedance 125 being at drive level for the passive media device 132, an embodiment provides that the connector system 100 can (i) detect when a coupled device is the passive media device 132, and (ii) provide signal output with adequate drive for the passive media device 132. For example, the user can couple a microphone headset to a mobile computing device and have an internal amplifier drive output for the headset when the user is on a call. Also, the user can plug in ear buds or other small ear phones and have rich audio output, such as used for music playback.

Device Detection

FIG. 2 illustrates a table 200 for identifying a type of device coupled to a connector system of a host such as described with FIG. 1, under an embodiment of the invention. Reference made to elements of FIG. 1 is made for illustrative purposes. An embodiment of FIG. 2 assumes different class of devices, whether identified by type, manufacturer, kind, or other class distinction, often generate common signal characteristics that are identifiers of the particular class of the device. The signal characteristics may include, for example: (i) the identity signal line 115 that can have one of five possible values when first connected: float (between being pulled high and low), ground, 102K Ohm resistance, 220K Ohm resistance and 440K Ohm resistance; (ii) a voltage line signal that can be pulled high or low; (iii) a pair of signal lines that can individually be pulled high or low to provide four different combinations. Illustrative values populate the table of FIG. 2. Numerous additional variations are also possible. For example, the detected impedance on the identity line can have different granularity and identification levels, thus potentially enabling even more classes of detected devices.

The first four rows of the table 200 illustrate the different classes of devices that can be detected as a coupled device through a serial bus connection, under, for example, one or more of the standards currently in use today (e.g. CEA-936A). The devices may be detected through the signal line characteristics, such as provided through the combination of signal line levels of the voltage supply line 112, data pair line 114, and identity signal line 115. For example, under an enumeration of an existing standard body, the signal line characteristics may be used to detect the following classes of devices: one or more classes of active headsets 212, one or more classes of device chargers 214, and hybrid devices 216 (assuming active devices). Through use of a physical layer having a low characteristic line impedance (as shown by FIG. 1), one or more embodiments also enable detection of a one or more kinds of passive media devices 218.

Figure 3:
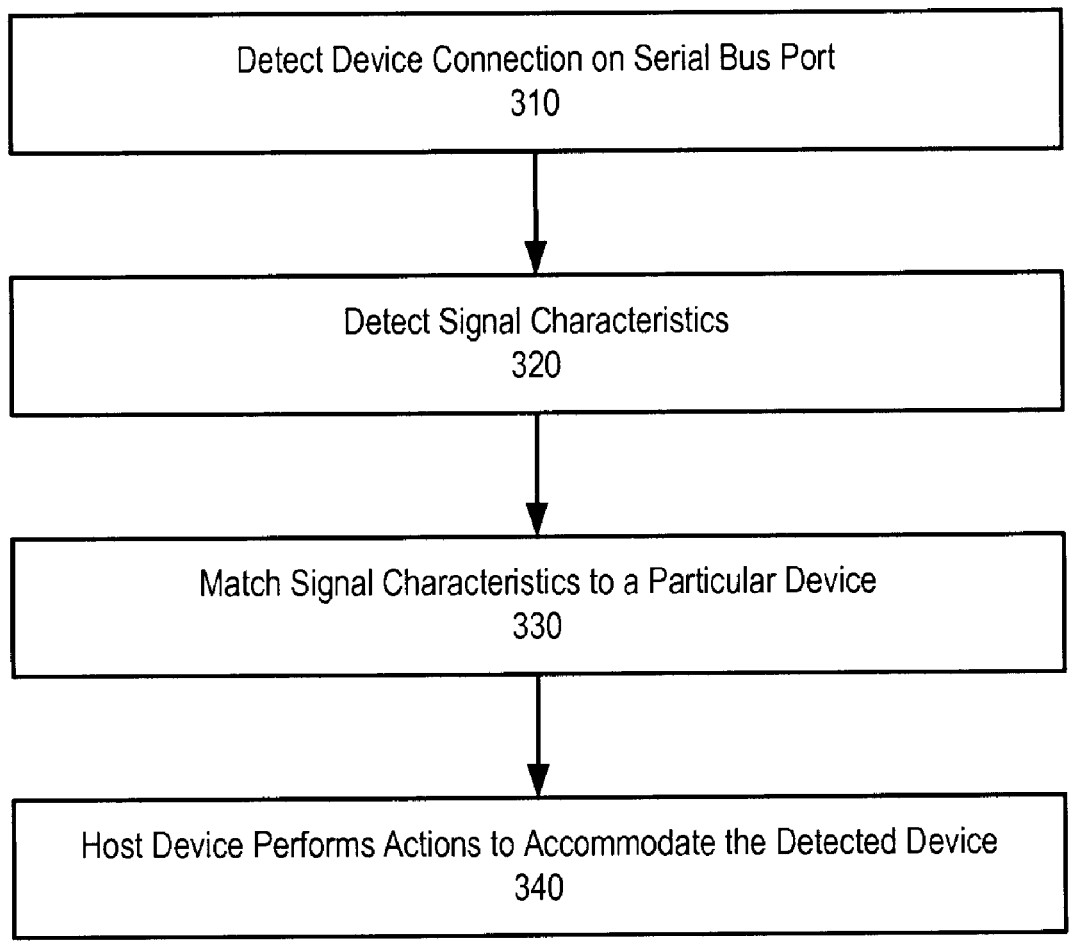
FIG. 3 illustrates a method for configuring a serial bus connector system to accommodate a particular connected device, under an embodiment of the invention.

FIG. 3 illustrates a method for configuring a serial bus connector system to accommodate a particular connected device, under an embodiment of the invention. A method such as described by FIG. 3 may be implemented using one or more embodiments such as described with FIG. 1 and FIG. 2. Accordingly, any reference made to elements described by FIG. 1 is intended to illustrate a suitable element or component for performing a step of sub-step being described.

In step 310, a device connection on a serial bus port is detected. For example, in the case of a car kit, a device connection may be detected when a peripheral stereo headset is connected to a mobile computing device (host controller).

Step 320 provides that relevant signal characteristics are detected from the signal lines of the connection formed by the host and peripheral device. In the context of a USB type connection, these signal characteristics may determine the state of the identity signal line 115 (e.g. ground, floating, 100K Ohms, 220K Ohms or 440K Ohms), the signal states of the data signal lines 114 (e.g. which is pulled high) and the voltage level (high or low) on the voltage supply line 112. Such an implementation is described in more detail with FIG. 2. Other embodiments may use other signal characteristics. For example, as described elsewhere, different impedance levels may be detectable from the identity signal line 115. Many video output devices, for example, have a characteristic impedance signal line that is in the range of 75K Ohms, and this signal line may be carried onto the identity signal line 115. For the USB serial bus connection, the ability to detect the signal characteristics may be an inherent or integral feature of the physical layer 120. For example, current CEA-936A standards provide for the physical layer 120 to detect many of the signal characteristics shown by FIG. 2, including through use of signal characteristics that can detect whether the identity signal line 115 is floating, or has an impedance of 100K Ohms, 220K Ohms, or 440K Ohms.

In step 330, the detected signal characteristics are matched to a particular device, or class of device (type of device, manufacturer or model etc.). In one embodiment, the processing resource 110 of the host device may employ a lookup table (such as shown and described with FIG. 2) to match the signal characteristics detected from the serial bus connection to a particular class of devices. In particular, one embodiment provides that the characteristic line impedance of a passive media device is detectable as a result of the low characteristic line impedance of the physical layer 120.

Step 340 provides that the host device performs actions or operations to accommodate the device identified on the serial bus connection. The operation may include, for example, setting a mode of operation for the serial bus connection, or identifying what data to drive on individual signal lines of the serial bus connection. For example, when the coupled device is identified as being an active media device, the host processor may drive audio out through the signal lines 114 of the serial bus connection at line level. At line level, volume control may be disabled. But when the coupled device is identified as being a passive media device, the host processor may not drive the audio out at line level, and enable volume control. If, as described with an embodiment of the FIG. 4, the detected output device is identified as being a video output device, one implementation provides that the host processor switches the operation mode of the serial bus connection. Where before the data pair lines 114 were used as the primary means for transmitting output, a mode of operation may be selected where the identity signal line 115 is used to carry analog video data, while the data pair lines 114 carry audio data (in stereo). Numerous other variations and alternatives are also contemplated.

Video Output

Figure 4:
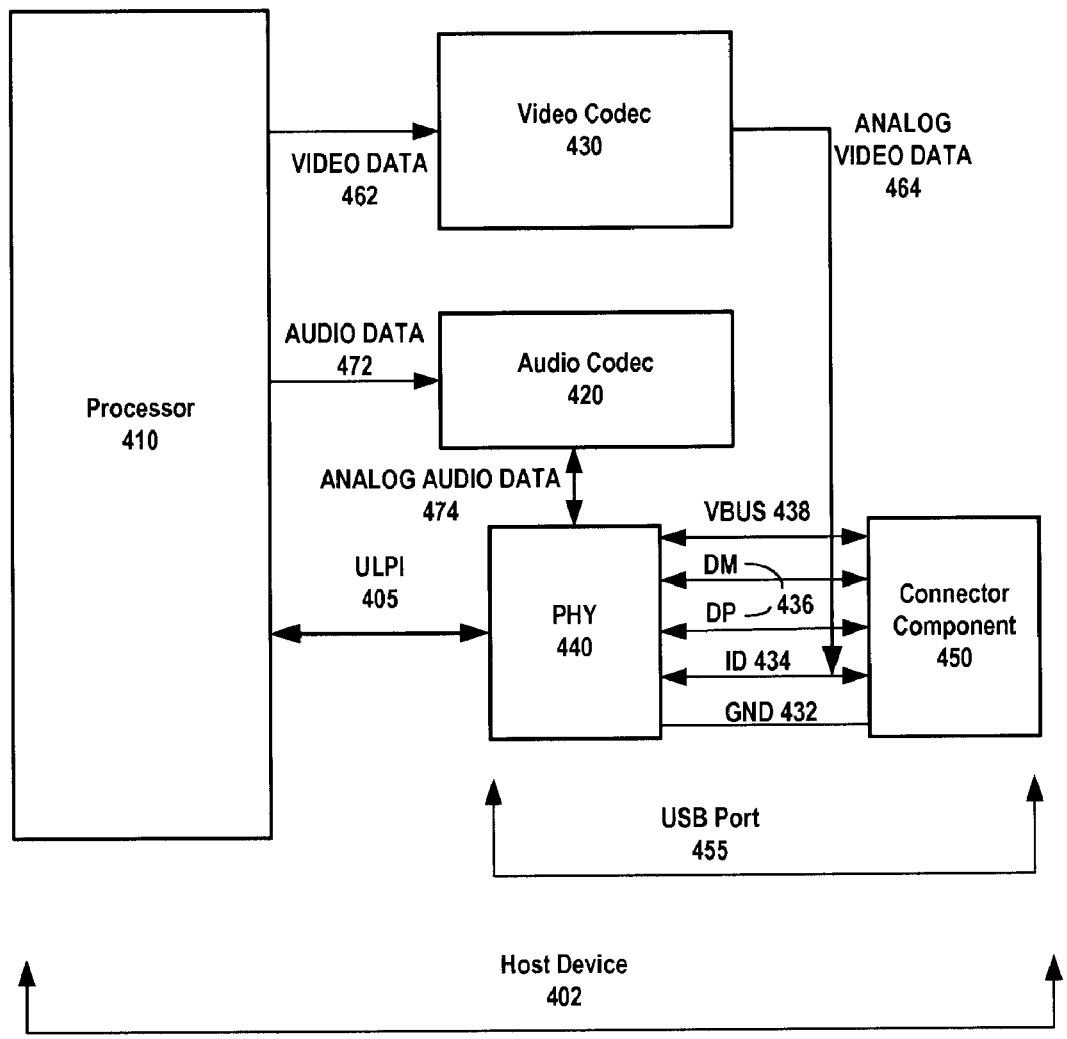
FIG. 4 illustrates a system for providing serial bus connectivity in which one available mode of operation provides for the transmission of analog video data, under an embodiment of the invention.

FIG. 4 illustrates a system for providing serial bus connectivity in which one available mode of operation provides for the transmission of analog video data, under an embodiment of the invention. In FIG. 4, a system includes a central processor 410, an audio codec 420, a video codec 430, and a physical layer 440 for a serial bus connector component 450. The system may reside on a host device 402. Under one implementation, physical layer 440 and serial bus connector component 450 combine to provide a USB port 455. The USB port 455 may be designed under, for example, the Mini-USB standards.

In an embodiment, the USB port 455 has multiple modes of operation. The modes may correspond to settings where signal lines that comprise the USB port 455 have different functions. As USB port 455 in compliance with the Mini-USB standards, the serial lines include a ground 432, an identity signal line 434, a pair of data lines 436, and a voltage supply line 438. However, more of fewer signal lines may be used, depending on the particular form factor and standard.

In one embodiment, USB port 455 may be operated in a (i) standard data transfer mode, (ii) environment-specific mode as dictated between, for example, paired devices that are not personal computers, and (iii) media/video transfer mode. In the standard data transfer mode, the USB port 455 may be capable of transmitting or receiving data in bulk, or through, for example, isynchonous or interrupt data transfer. The data transfer protocol may be compliant with, for example, USB 2.0 standards. The processor 410 may include a first interface 405 for enabling communications across the USB port 455. In one implementation, the interface 405 is configured as an Ultra Low Pin Interface (ULPI) to enable On-The-Go data transfer protocols and use. Under ULPI, the link between processor 410 and the physical layer 440 is reduced to 8 or 12 signal lines, as opposed to more signal lines for other USB interfaces (e.g. UTMI standard which provides 22 or 30 signal lines). With ULPI, data transfer and communications is possible using, for example, standard data transfer protocols such as USB 2.0 as well as offshoot protocols (for mobile and device environments) such as On-The-Go.

Under one implementation, in the standard data transfer mode, most, if not all, data transfer occurs through use of the pair of data lines 436. In the environment-specific mode, the host device 402 may transfer data in, for example, analog form. In addition, the host device 402 may also need to negotiate with the connected device for the role of host. The environment may correspond to one specifically accommodated by a standard (e.g. CEA-936A). In such a mode of operation, the signal lines that comprise the USB port 455 may be configured to, at least initially, carry signal characteristics that are indicative of the type or class of device being connected. In the media/video transfer mode, the USB port 455 carries media data on at least one signal line that is not one of the default lines for carrying data (e.g. pair of data lines 436).

In an embodiment, the standard data transfer mode is default. The host device 402 is able to receive and transfer data primarily through use of paired data lines 436, and the link between processor 410 and physical layer 440 is conducted through the interface 405. In one embodiment, when a device is first connected, it is identified (e.g. see FIG. 3), and at this time, the mode setting may be switched as part of the configurations performed by the processor 410 to accommodate the paired device.

Furthermore, under one embodiment, if the connected device is determined to be, for example, a video output device, the USB port 455 may be operated in the video transfer mode. As described with an embodiment of FIG. 3, the connected device may be detected as being a video output device through the impedance level provided on the identity signal line. When data is to be transferred, processor 410 communicates video data 462 to a video codec 430, which then converts the video data to an analog form 464. The analog video data 464 is communicated by the physical layer 440 across the identity signal line 434, as opposed to the pair of data lines 436. The data line pair 436 may be used to convey other data, such as analog audio data in stereo, or transmit audio and receive microphone input. To transmit audio data in analog form, the processor 410 may communicate audio data 472 to the audio codec 420, which provides analog audio output 474 to the physical layer 440.

In one embodiment, both the audio and video codec 420, 430 may be linked to the physical layer 440, independent of the interface 405. Thus, in the video transfer mode, the video and audio data may be communicated in analog form, outside of interface 405 that provides the link between the serial bus connection and the processor 410. In the default or other modes, the interface 405 provides the link by which data transfer between processor 410 and the serial bus connector occurs.

As described, a system such as shown and described with FIG. 4 may be implemented to comply with many requirements of current USB standards, such as CEA-936A. As such, an embodiment shown with FIG. 4 may be implemented on a Micro-USB port. A typical scenario may correspond to a portable video recorder that can output its media data (including video data) to a display screen.

According to an embodiment, the identity signal line 434 is paired to communicate with a video port of the video output device. The video output device may have a port constructed to comply with the form factor and signal line arrangement of the USB port 455, with the video port provided on the identity signal line. Alternatively, FIG. 5A illustrates a connector cable 510 that connects a standard, video/audio port of a video output device to a Mini-USB (or other small factor USB) port. The connector cable 510 includes one end 512 having a video plug 514, and a pair of audio plugs 516. Another end 518 includes a male Mini-connector 520 that is configured to mate with, for example, USB port 455 (FIG. 4). The cable 510 extends the video plug 514 to the identity signal line 434 (FIG. 4), and the pair of audio plugs 516 to the pair of data lines 436 (FIG. 4).

FIG. 5B illustrates an alternative connector cable 550 that connects a video port of a video output device to a Mini-USB port (such as provided by the USB port 455). One end 552 includes only a video plug 554, which can mate with, for example, a digital camera or other device which may not have video. Another end 562 includes the Mini-USB connector 572, which may use only one pin to convey data.

FIG. 5C illustrates a multi-pin plug 580 that connects a plug port of a device (video or otherwise) to a Micro-USB port (such as provided by the USB port 455). A plug end 582 may include, for example, three pins, depending on a configuration used. Each pin 593 may carry data, such as video data, audio output data, and/or microphone data. A connector end 584 may provide a male connector for the USB port 455. When the plug end 582 includes three pins 593, data from or to two of the pins may be carried to the pair of data lines 436 (FIG. 4) of the USB port 455. A third pin may be used to carry data that extends to the identity signal line 434 of the USB port 455.

With regard to an embodiment such as provided with FIG. 5A or 5B, the presence of a video output device may be detected with an impedance on the identity signal line of the USB port 455. For example, many current video output devices have video plug terminals with characteristic impedance in the range of 75K Ohms. As described with other embodiments, the physical layer 440 (FIG. 4) may employ impedance detection hardware or functionality to identify the value of the impedance on the identity signal line 434 (or other signal line). The processor 410 may then use a lookup table (e.g. see FIG. 2) to pair the detected impedance to a device. Upon determining the device is a video output device, the processor 410 may implement a mode operation, where video analog data is, for example, transferred out using the identity signal line 434.

Similar concepts may be employed with other types of paired devices to enable data transfer using signal lines other than the paired data signal lines 436. For example, in an embodiment to FIG. 5C, data from or to a third pin of the plug may be conveyed with the identity signal line.

Still further, another embodiment contemplates an adapter that can interconnect a serial bus connector (e.g. Mini-USB) with a video jack or plug of a video output device. The adapter may include a cable that interfaces with, for example, the video input port of the output device, as well as the USB port of a host device. The connection achieved may resemble one of the embodiments provided with FIG. 5A-5C.

While embodiments provided herein have been described with specific reference to various USB standards and configurations, other embodiments contemplate different kinds of serial bus connectors. For example, one or more embodiments may be employed on a FIREWIRE standard, which utilizes two pairs of data lines. In such an alternative embodiment, signal lines other than the data pair lines may be used to convey additional data (e.g. video data).

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

The invention claimed is:

1. A system comprising:
a connector component that provides a plurality of signal lines, the connector component being configured to mate with a connector component of a second device to extend communications with the second device using the plurality of signal lines; and
a physical layer coupled to the connector component via the plurality of signal lines, wherein when the connector component is mated with the connector component of the second device, the physical layer being configured to (i) identify what type of device the second device is, and (ii) based on the type of device identified, select a mode of operation from a plurality of modes;
wherein the physical layer enables use of the plurality of signal lines in each of the plurality of modes, the plurality of signal lines including at least a pair of signal lines and an identity line, and the plurality of modes including (i) a first mode in which the pair of signal lines communicates digital data and the identity line communicates identification information, and (ii) a second mode in which the pair of signal lines and the identity line are configured to communicate an analog media signal concurrently, including analog video data on the identity line.

2. The system of claim 1, wherein the physical layer has a characteristic impedance that is less than or equal to an impedance of the second device.

3. The system of claim 2, wherein a ratio of the characteristic impedance of the physical layer to the impedance of the second device is between 1:2 and 1:8.

4. The system of claim 2, wherein a ratio of the characteristic impedance of the physical layer to the impedance of the second device is between 1:3 and 1:4.

5. The system of claim 2, wherein the characteristic impedance of the physical layer is less than about 10K Ohms.

6. The system of claim 2, wherein the characteristic impedance of the physical layer is less than about 20K Ohms.

7. The system of claim 2, wherein physical layer communicates an output audio signal to the second device after identifying the second device.

8. The system of claim 1, wherein the second device is a stereo audio output device or a mono-audio output device.

9. The system of claim 1, wherein the type of device includes at least one of (i) an active media device, (ii) a charger device having a first recharge amperage, and (iii) a charger having a second recharge amperage, wherein the second recharge amperage is greater than the first recharge amperage.

10. The system of claim 1, wherein the connector component and the physical layer form at least part of a Universal Serial Bus connector.

11. The system of claim 10, wherein the Universal Serial Bus connector is a mini-Universal Serial Bus connector.

12. A system comprising:
a connector component that provides a plurality of signal lines, the connector component being configured to mate with a connector component of a second device to extend communications with the second device using the plurality of signal lines;
a physical layer coupled to the connector component via the plurality of signal lines; and
a processing resource coupled to the physical layer, wherein when the connector component is mated with the connector component of the second device, at least one of the processing resource and the physical layer is configured to (i) identify what type of device the second device is, and (ii) based on the type of device identified, select a mode of operation from a plurality of modes;
wherein the physical layer enables use of the plurality of signal lines in each of the plurality of modes, the plurality of signal lines including at least a pair of signal lines and an identity line, and the plurality of modes including (i) a first mode in which the pair of signal lines communicates digital data and the identity line communicates identification information, and (ii) a second mode in which the pair of signal lines and the identity line are configured to communicate an analog media signal concurrently, including analog video data on at least one of the pair of signal lines or the identity line.

13. The system of claim 12, wherein the physical layer is configured to identify one or more signal characteristics from the plurality of signal lines, and wherein the processing resource matches the one or more signal characteristics with a type of device.

14. The system of claim 13, wherein the processing resource performs operations to configure use of the connector component in response to the processing resource identifying the type of device the second device is.

15. The system of claim 12, wherein the connector component and the physical layer form at least part of a Universal Serial Bus connector.

16. The system of claim 15, wherein the Universal Serial Bus connector is a mini-Universal Serial Bus connector.

17. The system of claim 12, wherein the physical layer has a characteristic impedance that is less than or equal to an impedance of the second device.

18. The system of claim 17, wherein the characteristic impedance of the physical layer is less than about 10K Ohms.

19. The system of claim 17, wherein physical layer communicates an output audio signal to the second device after identifying the second device.

* * * * *